United States Patent [19]
Iida

[11] 3,778,138
[45] Dec. 11, 1973

[54] SPECIAL PHOTOGRAPHING DEVICE FOR A CINECAMERA

[75] Inventor: Yozo Iida, Tokyo, Japan

[73] Assignee: Nippon Kogaku K.K., Tokyo, Japan

[22] Filed: Sept. 22, 1971

[21] Appl. No.: 182,667

[30] Foreign Application Priority Data
Sept. 30, 1970 Japan .................... 45/85419

[52] U.S. Cl. .................................... 352/91
[51] Int. Cl. .............................. G03b 21/36
[58] Field of Search ........................ 352/91

[56] References Cited
UNITED STATES PATENTS
3,246,944  4/1966  Winkler ........................... 352/91
3,545,852  12/1970  Winkler et al. .................. 352/91
3,549,249  12/1970  Katsuyama ....................... 352/91

Primary Examiner—Samuel S. Matthews
Assistant Examiner—Russell E. Adams, Jr.
Attorney—Harry G. Shapiro

[57] ABSTRACT

A photographing device incorporated in a cinecamera having means to control the output of an electric drive motor either by selecting forward or reverse circuits for the motor or by actuating a mechanical clutching mechanism. Film metering means and exposure opening varying means are coordinated with the drive motor output control means for effecting various modes of special photography with the camera, including normal exposure, double exposure, overlap exposure, automatic fade-out, automatic fade-in and reverse exposure.

15 Claims, 2 Drawing Figures

PATENTED DEC 11 1973

3,778,138

INVENTOR.
YOZO IIDA
BY Harry G. Rogers
ATTORNEY

SPECIAL PHOTOGRAPHING DEVICE FOR A CINECAMERA

BACKGROUND OF THE INVENTION

1. Field of the Invention

This invention generally relates to a cinecamera having multiple modes of operation, and more particularly to such cinecameras which use film magazines or cartridges of the type that cannot reverse the direction of film feed.

2. Description of the Prior Art

Many conventional cinecameras provide a limited variety of operating modes so that many photographing techniques, such as fade-ins and fade-outs, and double exposures cannot be accomplished with such cameras. This is especially true of cinecameras which are designed for use with film magazines or cartridges which cannot reverse the direction of rotation of the film take up reel.

SUMMARY OF THE INVENTION

This invention seeks to provide a photographing device for use with cinecameras which provide several special photographing modes including normal exposure, double exposure, overlapping exposure, automatic fade-out, automatic fade-in and reverse exposure.

The photographing device of the present invention includes a film transport means driven by a reversible electric motor drive associated with film take-up means for rotating a film take-up shaft within a magazine or cartridge. Shutter means associated with the motor and the film transport means includes means for gradually varying the film exposure opening from its fully closed position to its fully open position and vice-versa. The direction of rotation of the drive is controlled either by selection of forward or reverse circuits for the electric motor or by actuating a mechanical clutch. film-length determining means coact with the electric motor drive circuits to provide a predetermined quantity of film for special photographing operations. A first change-over means is positioned to coordinate the film take-up means, shutter varying means and film-length determining means to produce different modes of operation of the cinecamera. The neutral position of the first change-over means connects the motor with the film take-up means, a first position disconnects the motor from the film take-up means and instead connects the motor with the film-length determining means and may simultaneously actuate the means for varying the film exposure opening from open to closed position. Second and third positions actuate the means for varying the film exposure opening from closed to open position and open to closed position respectively while connecting the motor with the film take-up means. A second change-over means may be actuated for varying the film exposure in cooperation with the first change-over means. A manually operated third change-over means controls the shutter film exposure opening and is manually operated either independently of or in cooperation with the first and second change-over means.

The above and other objects, features and advantages of the present invention will become fully apparent from the following detailed description of an embodiment thereof taken in conjunction with the accompanying drawings.

DESCRIPTION OF THE PREFERRED EMBODIMENTS

Figure 1:
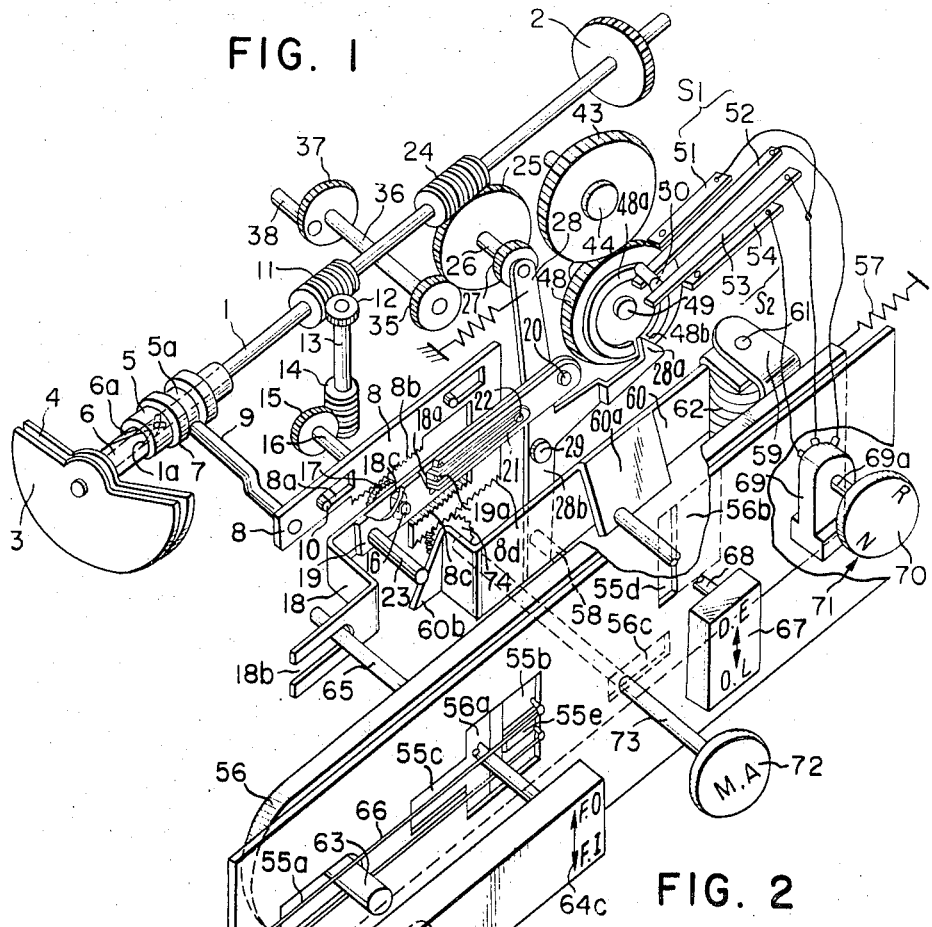
FIG. 1 is a perspective view of the special photographing device according to an embodiment of the present invention.

Referring to the drawings, a shutter shaft 1 has a transmission gear 2 secured thereto at one end, through which gear the shutter shaft may be driven to rotate in a normal direction or in the reverse direction by a motor 80 (to be described) and stopped always at a predetermined position by a known means. The shutter shaft 1 is operatively associated with a film transport pawl means (not shown) for moving a film in the normal or reverse direction in accordance with the direction of rotation of the shutter shaft upon shutter operation. At the other end of the shutter shaft 1 which is formed with a shutter opening adjusting lead groove 1a, a first shutter sector 3 is fixedly secured to the shaft and a second shutter sector 4 is secured to a sleeve 6 loosely fitted around the shutter shaft and formed with a lead groove 6a. A slidable ring 5 is slidably mounted on the sleeve 6 and has a studded guide pin 7 engageable with the lead grooves 1a and 6a. The slidable ring 5 has an annular groove 5a formed circumferentially thereof which may be engaged by a pin 9 to be described. As the ring 5 is slid leftwardly as viewed in FIG. 1, the opening defined by the two shutter sectors 3 and 4 is continuously varied from a fully open position to a fully closed position. (The shutter opening is fully open or maximum in the position shown in FIG. 1.)

A substantially U-shaped rack plate 8 for adjusting the shutter opening is slidably mounted to the body of a camera (not shown) through cooperation between a guide slot 8a formed in the rack plate and a pin 10 secured to the camera body and received in the guide slot 8a. In the inner sides of the two leg portions of the U-shaped rack plate 8 there are formed racks 8b and 8c, respectively, which may be selectively engaged by a pinion 17 driven to rotate by a worm gear 11 securely mounted on the shutter shaft 1 which drives transmission gears 12, 14 and 15. During the normal rotation of the shutter shaft 1, the pinion 17 engages the rack 8b to thereby move the opening adjusting rack plate 8 leftwardly as viewed in FIG. 1 so that the shutter opening is continuously varied by means of the pin 9 at a predetermined rate from a fully open position to a fully closed position so as to accomplish a fade-out. In the lower side of the lower leg portion of the opening adjusting rack plate 8 there is formed a rack 8d which is associated with a manually operated member 72 to be described. The pinion 17 and the worm wheel 15 are connected together by a common shaft 16 journalled to a first clutch lever 19. The members 1 to 17 together constitute a shutter opening adjusting mechanism.

The first clutch lever 19, together with a second clutch level 18, is pivotally mounted at one end to a fixed portion of the camera body by means of a shaft 20, and the two clutch levels 19 and 18 are fixedly overlapped with each other by means of a spring 21 secured to the clutch level 19 by a pin 22 in such a manner that rectangular slots 18a and 19a formed in the respective clutch levels 18 and 19 are aligned with each other. The second clutch level 18 has the other end thereof formed with an elongated groove 18b for receiving an interlocking shaft 65, which will be described later. Thus, the first and second clutch levers 19 and 18 are individually pivotable against the force of the spring 21 and the first clutch lever 19 is also pivotable with the second clutch lever 18 when the latter is swung. The second clutch lever 18 is formed with an escape hole 18c for receivng therein the shaft of the pinion 17. The first clutch lever 19 is adapted to be raised by a shaft 23 secured thereto and ride on the left end ramp 60b of an interlocking lever 60 to be described, so that the pinion 17 may engage the rack 8b. The second clutch lever 18 is adapted to be swung up and down by the interlocking shaft 65 received in the elongated groove 18b and secured to an operating knob 64 to be described, Therefore, the pinion 17 may be moved by means of the first clutch lever 19 and the second clutch lever 18 via spring 21 so as to selectively engage the rack 8b or 8c.

A primary clutch lever 28 is pivotally mounted to a fixed portion of the camera body by means of a shaft 29 and biased counter-clockwise by a spring 30 so as to prevent a counter idle gear 43 mounted on a shaft 44 journalled to the camera body from engaging a clutch gear 27 (to be described) and to maintain an engagment between a clutch gear 25 and a take-up gear 35. Rotatably mounted at the upper end of the clutch lever 28 is a shaft 26 which carries thereon step-toothed clutch gears 25 and 27. The clutch gear 25 is always in rolling engagement with a worm 24 mounted on the shutter shaft 1 and the clutch gear 27 is engageable with the counter idle gear 43. In the embodiment shown in FIG. 1, the clutch gears 25 and 27 are selectively engageable with the take-up gear 35 and the counter idle gear 43. The take-up gear 35 is mounted on one end of spool shaft 36 whose other end carries a gear 37 having a shaft 38 engaged with a take-up core in an irreversible film cartridge (not shown) so as to rotate the take-up core. The clutch lever 28 has a downwardly extending leg 28b whose lower end face is engaged by an interlocking pin 58 formed integrally with a slide lever 56, to be described, so that displacement of the pin 58 causes the lever 28 to swing clockwise (as viewed in FIG. 1) against the force of a spring 30. The idle gear 43 is mounted for rotation on a shaft 44 fixed to a fixed portion of the camera body and meshes with a counter gear 48 so as to transmit the drive thereto through clutch gears 25 and 27.

In the illustrated embodiment, when it is desired to expose some film more than once, an automatic film length determining means is provided which coacts with the drive motor to provide a metered quantity of film for multiple exposure.

Figure 2:
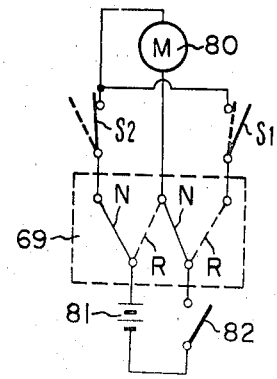
FIG. 2 is a diagram of the electric circuit used in the device of the present invention.

Members designated by numerals 48 to 54 constitute the automatic film-length determining mechanism for ensuring that a predetermined length of the film is transported in the normal direction. These members include the engaging pin 50 studded in the front face of the counter gear 48, and switch contacts 51, 52, 53 and 54. The contacts 52 and 53 protrude into the circular path of the pin 50 and provide an automatic stop function. The contact 51, together with the contact 52, forms a switch S1 in a reverse rotation circuit. The contact 54, together with the contact 53, forms a switch S2 in a normal rotation circuit. The position shown in FIG. 1 is the normal photographing position in which the reverse rotation circuit switch S1 is urged to open by the engaging pin 50 (FIG. 2, solid line position). If the counter gear 48 is rotated counterclockwise from the position shown in FIG. 1, the engaging pin 50 thereon will urge the contact 53 to open the switch S2 in the normal rotation circuit (FIG. 2, dotted line position). The counter gear 48 is arranged so that the engaging pin 50 thereon rotates an equal amount from it sreference position both in the normal (counterclockwise) direction and in the reverse (clockwise) direction.

A first exposure of the film is effected by retracting the clutch gear 25 out of engagement with the take-up gear 35 to substantially fix the take-up core of the film magazine, and engaging the clutch gear with the counter gear 48 to thereby engage the film-length determining means. To ensure that once a first exposure has been effected, a subsequent operation cannot take place until all of the exposed film is rewound, the clutch lever 28 is provided with a laterally extending hooked arm 28a which is received in a notch 48b formed in a shoulder 48a provided on the front face of the counter gear 48. With the lever arm 28 and the counter gear 48 in this position, pin 50 opens, contacts 51 and 52 of a switch S1 forming a reverse rotation circuit and the clutch gear 25 is engaged with the take-up gear 35 as shown. When the clutch lever 28 is rotated clockwise from the position shown in FIG. 1, the clutch gear 25 is disengaged from the take-up gear 35 while the clutch gear 27 is engaged with the idle gear 43, whereby rotation of the shutter shaft 1 is transmitted through clutch gears 25, 27 and idle gear 43 to the counter gear 48 to slightly rotate gear 48 so as to bring the hook 28a into engagement with the outer side wall of the shoulder 48a and thereby maintain the engagement between the clutch gears 27 and the idle gear 43.

Numeral 55 designates a base plate or an outer wall fixed to a fixed portion of the camera body and has various operating members extended forwardly therethrough to be manually operated from outside of the camera body. A slide plate 56 which is slideable relative to the back side of the base plate 55 is held by a shaft 63 which extends through a guide slot 55a formed in the base plate 55 and is fitted into a hole 64a formed in an OL-DE first change-over or operating knob 64 to be described. (OL and DE are abbreviations for "overlap" and "double exposure" respectively). The slide plate 56 is normally biased to a reference position (the FIG. 1 position) by a tension spring 57 and can be slid leftwardly against the force of the spring 57 by moving the operating knob 64, due to the cooperation between the shaft 64 and the guide slot 55a.

In the center of the slide plate 56 there is studded an interlocking pin 58 for pressing the downwardly extending leg 28b of the clutch lever 28, and at the right end of the side plate 56 an interlocking lever 60 is held by means of a U-shaped holder member 59, a shaft 61 and a spring 62 in such a manner that the lever 60 is generally biased toward slide lever 56. Formed intermediately of the interlocking lever 60 is a downwardly inclined surface 60a which is adapted to engage with the end of operating shaft 68 of an OL-DE second change-over knob 67 (to be described) so as to vary the path followed by the ramp 60b forming the left end of the interlocking lever 60 by moving lever 60 toward or away from slide lever 56. The ramp 60b is adapted to raise the pin 23 studded in the first clutch lever 19 and thereby engage the pinion 17 with the rack 8B so that the rack plate 8 may be moved leftwardly upon rotation of the shutter shaft 1 so as to vary the shutter opening at a predetermined rate with the aid of the lead grooves 1a, 6a and the pin 7.

The operating knob 64 is intended to effect overlap exposures, double exposures, fade-ins and fade-outs, and it is disposed outwardly of the camera body. The hole 64a formed at one end of the operating knob 64 receives the shaft 63 extending from the slide plate 56 through the elongated slot 55a in the base plate 55 so as to allow the knob 64 to pivot about the shaft 63. At the other end of the operating knob 64 there is studded an interlocking shaft 65, which extends through an escape hole 55b in the base plate 55 and further through an escape hole 56a in the slide plate 56 and is slideably received into the elongated groove 18b in the second clutch lever 18 so as to cause the second clutch lever 18 to pivot about the shaft 20. The operating knob 64 is also slideable horizontally (i.e. in the direction for OL and DE). A spring 66 is held on a shaft 75 in such a manner that the shafts 63 and 65 and the setting member 55e provided on the base plate 55 for setting the reference position of the operating knob 64 are all interposed between the two arms of the spring 66.

The OL-DE change-over knob 67 is vertically slideable by the cooperation between an operating shaft 68 studded in the knob which extends through a guide slot 55d and further through a guide slot 55d and further through the escape hole 56b formed in the slide plate 56 and having a width corresponding to the range of movement of the slide plate 56. (In FIG. 1, the knob 67 is shown in depressed position). The end of the operating shaft 68 is engaged by the inclined surface 60a of the interlocking lever 60 so that, with the aid of the spring 62, vertical movement of the change-over knob 67 will cause interlocking lever 60 to move toward or away from slide lever 56 to move the left end ramp 60b of the interlocking lever 60 into and out of engagement with pin 23.

Numeral 69 designates a normal-reverse change-over switch having a change-over means therein. A change-over dial 70 operable exteriorly of the camera body is connected to the change-over means in the switch 69 for rotation therewith by means of a shaft 69a. The dial 70 carries thereon marks N and R indicating normal rotation and reverse rotation, respectively. The normal reverse change-over switch 69 acts with respect to a motor circuit in such a manner that its contacts assume a position as shown by the solid lines in FIG. 2 so as to rotate a motor 80 in the direction for taking up the film (i.e. the normal direction) when the mark N on the dial 70 is registered with an index 71 and that the contacts assume a position as shown by the dotted lines in FIG. 2 so as to rotate the motor 80 in the direction for rewinding the film (i.e. the reverse direction). As shown in FIG. 2, the motor circuit comprises a power source such as battery 81 and a start switch 82 and associated with a shutter button (not shown).

OPERATION

Normal exposure (N)

The change-over dial 70 is rotated to register the mark N thereon with the index 71 so that the normal-reverse change-over switch 69 forms the solid line circuit within the square shown in FIG. 2. By depressing the shutter button (not shown), the start switch 82, associated therewith, is closed to rotate the film take-up shafts 36, 37, 38 together with the shutter shaft 1, transmission gear 24, worm wheel 25 and associated film transport pawl (not shown), whereby the film is taken up and the normal exposure mode is effected.

Double Exposure (DE)

The DE-OL change-over knob 67 is first raised so that the operating shaft 68 coacting with inclined surface 60a and the spring 62 move the lever 60 toward slide lever 56, thereby releasing the engagement between the ramp 60b and the shaft 23 of the clutch lever 19. Subsequently, the mark N on the change-over dial 70 is registered with the index 71 and the operating knob 64 is actuated in the OL-DE direction as indicated by an arrow 64b, so that the slide plate 56 is moved leftwardly against the force of the tension spring 57. This causes the counter clutch operating pin 58 on the slide plate 56 to rotate the clutch lever 28 clockwise about the shaft 29 against the force of the tension spring 30, thereby disengaging the clutch gear 25 from the take-up gear 35 while bringing the clutch gear 27, integral with the clutch gear 25, into engagement with the counter idle gear 43. Additionally, the hook 28a of the clutch lever 28 is disengaged from the notch 48b of the counter gear 48 upon engagement of the clutch gear 27 with the counter idle gear 43, thereby allowing the counter gear 48 to be rotated.

The start switch 82 is then closed to transmit the drive from the shutter shaft 1 to the counter gear 48 so as to enable a predetermined amount of film to be exposed. At the same time, the pin 50 on the counter gear 48 is rotated counterclockwise to actuate the switch contact 53 out of engagement with the contact 54 to thereby cut off the normal rotation circuit, thus automatically stopping the transportation of the film and completing the first exposure. The portion of the film thus exposed is drawn into a suitable space in the magazine or in the camera body and stored there in slack condition. It will be apparent that when the first exposure does not require the full use of the predetermined length of film, the shutter button may be released halfway in the course of the first exposure. After the first exposure has started and until the film has been rewound in preparation for the second exposure, the counter gear 48 cannot be declutched because shoulder 48a coacts with the hook 28a to keep clutch lever 28 in the clockwise, clutched position.

After the first exposure has been finished, a suitable lens cap or the like may be attached to the photographing lens to prevent entry of light into the film. Alternatively, the first and second shutter sectors 3 and 4 can be manually closed to prevent light from entering by means of control knob 72 connected via shaft 73 to pinion 74 which engages rack 8d to move shutter opening adjusting plate 8 and thereby control the setting of the shutter sectors 3 and 4.

After the shutter has been closed or the lens capped, the mark R of the normal-reverse change-over dial 70 is registered with the index 71 so that the normal-reverse change-over switch 69 forms a reverse rotation circuit (shown by the dotted lines in the rectangle, in FIG. 2). By depressing the shutter button (not shown), the start switch 82 associated therewith is closed to operate the shutter shaft 1 and unshown film transport pawl means in the reverse direction for rewinding the slackly stored film portion, while rotating the counter gear 48 in the reverse direction (clockwise). Thus, the engaging pin 50 on the counter gear 48 is also rotated in the direction opposite to that for taking up the film and at the end of such reverse rotation, the pin 50 actuates the contact 52 in the reverse rotation circuit to open the switch S1, thereby stopping the movement of the film. Of course, the amount of film thus rewound is equal to the amount of film stored in slack condition (i.e. the amount of film subjected to the first exposure). Upon opening of the switch S1, the hook 28a of the clutch lever 28 is engaged with the notch 28a of the counter gear 48 to enable the clutch gear 27 to be disengaged from the idle gear 43, so that the clutch gear 25 is returned into engagement with the take-up gear 35, when the operating member 64 is returned to the position of FIG. 1.

After the rewinding operation has been finished, the dial 70 may again be rotated to register the mark N thereon with the index 71 and the contact 82 again closed to effect a re-exposure for a double shot.

Overlap Exposure (OL)

The DE-OL change-over knob 67 is first depressed (FIG. 1) to cause the operating shaft 68 to press the inclined surface 60a of the interlocking lever 60 against the force of the spring 62 so that the leftward ramp 60b of the lever 60 engages the shaft 23. The change-over dial 70 is then rotated to register the mark N thereon with the index 71. Subsequently, the operating member 64 is moved in the direction of the arrow 64b. As a result, the clutch lever 28 is actuated in the same way as described with respect to the double exposure, so as to cut off the transmission of the drive to the take-up shaft while allowing the transmission of the drive to the counter gear 48. Additionally, at the same time, the left end ramp 60b of the interlocking lever 60 secured to the slide plate 56 by holder 59 raises the first clutch lever 19 by means of shaft 23 to pivot about the shaft 20 and engage the pinion 17 with the rack 8b, thereby moving the shutter opening adjusting plate 8 leftwardly as viewed in FIG. 1. When the shutter button (not shown) is depressed to close the start switch 82 associated therewith, the shutter sectors 3 and 4 are moved from their fully open position to their fully closed position at a predetermined speed by means of the slideable ring 5, thus accomplishing a fade-out.

In the overlapping exposure sequence, the fade-out exposure is synchronized with the automatic stop mechanism in the counter gear portion. If the fade-out lasts long enough, the film movement will be automatically stopped by the opening of the normal rotation circuit switch S2 upon engagement between the pin 50 and the contact 53, as described for double exposure operation. During the fade-out, the knob 67 remains depressed. Again it is needless to say that the film portion subjected to the first exposure is slackly stored in a suitable space in the magazine or in the camera. Rewinding of the film is effected in the same way as described already and its description is omitted herein, but in this case it should be noted that neither the closing of the shutter opening nor the attachment of a lens cap to the photographing lens is necessary for rewinding the film after the first exposure because the optical path is automatically cut off by the fade-out operation.

After the required film rewinding has been finished, the change-over dial 70 is again rotated to register the mark N with the index 71 and the operating member 64 is moved to the right (opposite the direction of arrow 64b) and is depressed in the direction of arrow 64c for the FI (Fade-in) so as to pivot about the shaft 63. Accordingly, the first clutch lever 19 together with the second clutch lever 18 are rotated counterclockwise by means of the interlocking shaft 65 and the spring 21 to lower the pinion 17 until it engaged the rack 8c. When the shutter button is then depressed, the switch 82 is closed to enable a fade-in exposure to be precisely superposed on the previously effected fade-out shot, thus accomplishing a complete overlap exposure. After the fade-in exposure is finished, the pinion 17 is disengaged from the rack 8c so as to bring the apparatus to a position ready to effect a normal exposure by depression of the shutter button.

Automatic Fade-out

The operating member 64 is raised against the force of the spring 66 so that the second and first clutch levers 18 and 19 are rotated together clockwise about the shaft 20 by means of the spring 21 and the shaft 65 received in the guide groove 18b of the second clutch lever 18, whereby the pinion 17 rotatably mounted on the first clutch lever 19 is engaged with the rack 8b to thereby move the shutter opening adjusting plate 8 leftwardly as viewed in FIG. 1. When the shutter button is then depressed to close the switch 82, the slidable ring 5 is moved by means of the shaft 9 to move the sectors 3 and 4 at a predetermined speed from the fully open position to the fully closed position with the aid of the pin 7 and lead grooves 1a and 6a, thus accomplishing a fade-out. When the operating knob 64 is released, this knob and the pinion 17 are returned to their normal position due to the cooperation between the spring 66 and the projection 55e.

Automatic Fade-In

A fade-in is effected by depressing the operating knob 64 in the FI direction to pivot about the shaft 63, and the procedures involved therein are the same as those described with respect to the second exposure in the overlap photography and need not be described any further.

Automatic Reverse Shot

The change-over dial 70 is rotated to register the mark N with the index 71. The manually operated dial 72 is then rotated to fully close the shutter sectors 3 and 4 or the photographing lens of the camera is covered with a cap or the like to prevent entry of light into the film. Then the DE-OL change-over knob 67 is raised into DE position, and the operating member 64 is moved in the DE direction (arrow 64b). When the shutter button is depressed, the film is transported by the unshown film transport pawl without being exposed to light. With the rotation of the counter gear 48, the pin 50 thereon is also rotated to actuate the contact 53 to open the normal rotation circuit switch S2, thereby automatically stopping the film. The portion of the film transported during that while is stored slackly in a suitable space within a film magazine or camera because the gear 37 is now stopped. Subsequently, the shutter sectors 3 and 4 are opened or the lens cap is removed from the photographing lens, whereafter the change-over dial 70 is rotated to register the mark R thereon with the index 71. Thereupon, the shutter button is depressed to close the switch 82 for effecting a reverse exposure. With the reversal of the counter gear 48, the pin 50 thereon actuates the contact 52 to open the reverse rotation circuit switch S1, thereby automatically stopping the film. Of course, the lever 28 and the operating member 64 return to their initial positions.

Fading by Manual Operation

Fade-out and fade-in may be manually accomplished at a desired speed by rotating the manually operated dial 72.

The various effects of the present invention as described hitherto will be summarized in the following table.

| Modes of shot | Related Members | | | | | Length of film photographed | Types of stop |
|---|---|---|---|---|---|---|---|
| | #70 | #64 | #67 | #37 | #48 | | |
| Normal (N) | N ▲ | Neutral position. | ↑DE or ↓OL | Moved | Stopped | Optional | Manual stop by #82. |
| Double (DE): | | | | | | | |
|   1st shot | N ▲ | OL DE ← | ↑DE | Stopped | Moved | Fixed | Automatic stop by S2. |
|   Rewind | R ▲ | OL DE ← | ↑DE | Stopped | Moved | Fixed | Automatic stop by S1. |
|   2d shot | N ▲ | Neutral position. | ↑DE or ↓OL | Moved | Stopped | Optional | Manual stop by #82. Ready for N |
| Overlap (OL): | | | | | | | |
|   Fade-out | N ▲ | OL DE ← | ↓OL | Stopped | Moved | Fixed | Automatic stop by S2. |
|   Rewind | R ▲ | OL DE ← | ↓OL | Stopped | Moved | Fixed | Automatic stop by S1. |
|   Fade-in | N ▲ | ↓FI | ↓OL | Moved | Stopped | Optional | Manual stop by #82. Ready for N |
| Auto fade-out (FO) | N ▲ | ↑FO | ↑DE or ↓OL | Moved | Stopped | Optional | Manual stop by #82. |
| Auto fade-in (FI) | N ▲ | ↓FI | ↑DE or ↓OL | Moved | Stopped | Optional | Manual stop by #82. Ready for N |
| Auto reverse (R): | | | | | | | |
|   Take-up | N ▲ | OL DE ← | ↑De | Stopped | Moved | Fixed | Automatic stop by S2. |
|   Reverse | R ▲ | OL DE ← | ↑DE | Stopped | Moved | Fixed | Automatic stop by S1. |
| Manual fade-in/fade-out (M) | N ▲ | Neutral position. | ↑DE or ↓OL | Moved | Stopped | Optional | Manual stop by #82 thru manual rotation of #72. |

It is believed that the advantages and improved results of the invention will be apparent from the foregoing description of a preferred embodiment of the invention. It will be apparent that various changes and modifications may be made without departing from the spirit and scope of the invention as sought to be defined in the following claims.

I claim:

1. Apparatus for a cinecamera comprising in combination, drive motor means having forward and reverse capacities, including a manually operable switch for controlling the direction of rotation of the drive motor means;

film transporting means operatively associated with the drive motor means;

shutter means for defining a film exposure opening operatively associated with the drive motor means;

varying means for varying the film exposure opening movable between an original position thereof in which the varying means is disconnected from the drive motor means, a first position in which the varying means is interconnected with the drive motor means to vary the film exposure opening from the open condition to the closed condition, and a second position in which the varying means is interconnected with the drive motor means to vary the film exposure opening from the closed condition to the open condition;

film take-up means selectively connected to the drive motor means;

film-length metering means engageable with and disengageable from the drive motor means for rewinding the film an amount corresponding to a predetermined length of forwardly fed film;

a first change-over means mounted on the camera body and movable between an original location in which the varying means is maintained in the original position and the film-length metering means is disengaged from the drive motor means, a first location in which the film-length metering means is engaged with the drive motor means, a second location in which the film-length metering means is disengaged from the drive motor means and the varying means is moved to the first position thereof, and a third location in which the film-length metering means is disengaged from the drive motor means and the varying means is moved to the second position thereof; and a second change-over means mounted on the first change-over means and engaged with the varying means to move the varying means to the first position when the first change-over means is moved to the first position thereof.

2. Apparatus for a cinecamera according to claim 1, wherein the first change-over means is biased to the original location thereof.

3. An apparatus for a cine camera according to 1, wherein the second change-over means includes an engaging portion at the free end thereof which is engaged with the varying means so as to move the varying means to said first position thereof when the first change-over means is moved to said first location.

4. Apparatus for a cinecamera according to claim 3, wherein the second change-over means is movable between a first position in which said engaging portion is disengaged from the varying means and a second position in which the engaging portion is engaged with the varying means to move the varying means to the first position thereof when the first change-over means is moved to the first location thereof.

5. Apparatus for a camera according to claim 4, wherein the second change-over means is biassed to the first position thereof.

6. Apparatus for a cinecamera according to claim 4, further comprising;
   a manually operable member for alternatively changing over the second change-over means between the first and second positions thereof.

7. Apparatus for a cinecamera according to claim 1, wherein the means for varying the film exposure opening includes pinion means connected to the drive motor means;
   rack means movably mounted on the camera body comprising a first rack for varying the film exposure opening in the direction from the open condition to the closed position and a second rack for varying the film exposure opening in the direction from the closed position to the open condition; and
   clutch means for alternatively engaging the pinion means with the first and second racks.

8. Apparatus for a cinecamera according to claim 7, wherein the clutch means includes a first clutch lever rotatably mounted on the camerabody and provided with the pinion means, a second clutch lever rotatable and coaxial with the first clutch lever, and spring means for biassing the first and second clutch levers to be aligned with each other.

9. Apparatus for a cinecamera according to claim 8, wherein the first clutch lever includes an interconnecting member engageable with the engaging portion of the second change-over means whereby the pinion means is moved to be engaged with the first rack by the engagement of the interconnecting member with the engaging portion when the second change-over means is in the second position and the first change-over means is moved to the said first location.

10. Apparatus for a cinecamera according to claim 8, wherein the second clutch lever is interconnected with the first change-over means so as to cause the pinion means to be disengaged from the first and second racks when the first change-over means is in said original location to cause the pinion means to be engaged with the first rack when the first change-over means is in said second location to cause the pinion means to be engaged with the second rack when the first change-over means is in said third location.

11. Apparatus for a cinecamera according to claim 7 further comprising;
   manually operable means for moving the rack means to vary the film-exposure opening defined by the shutter means.

12. Apparatus for a cinecamera according to claim 11, wherein the rack means further includes a third rack interconnected with the manually operable means.

13. Apparatus for a cinecamera according to claim 1, wherein the film take-up means is disengaged from the drive motor means when the first change-over means is in said first location and engaged with the drive motor means when the first change-over means is in said original, the second and the third location.

14. An apparatus for a cinecamera according to claim 13, wherein the first change-over means further includes primary clutch means alternatively connecting the drive motor means with the film take-up means and the film-length metering means.

15. Apparatus for a cinecamera according to claim 1, wherein the shutter means includes two shutter sectors.

* * * * *